United States Patent
Endo et al.

(10) Patent No.: US 6,902,781 B2
(45) Date of Patent: Jun. 7, 2005

(54) INK-JET RECORDING MEDIUM, SILICA PARTICLES AND SILICA DISPERSION

(75) Inventors: Kiyoshi Endo, Kaisei-machi (JP); Tomohiko Sakai, Hino (JP); Masako Kikuchi, Higashimurayama (JP)

(73) Assignee: Konica Corporation (JP)

( * ) Notice: Subject to any disclaimer, the term of this patent is extended or adjusted under 35 U.S.C. 154(b) by 75 days.

(21) Appl. No.: 10/401,253

(22) Filed: Mar. 27, 2003

(65) Prior Publication Data

US 2003/0194512 A1 Oct. 16, 2003

(30) Foreign Application Priority Data

Apr. 8, 2002 (JP) ........................................ 2002-104922

(51) Int. Cl.[7] .............................................. B41M 5/40
(52) U.S. Cl. ........................ 428/32.35; 428/32.28; 428/32.3; 428/32.31
(58) Field of Search ...................... 428/32.28, 32.3, 428/32.31, 32.35, 32.37

(56) References Cited

U.S. PATENT DOCUMENTS

| | | | |
|---|---|---|---|
| 6,492,005 B1 * | 12/2002 | Ohbayashi et al. | 428/32.29 |
| 2003/0114542 A1 * | 6/2003 | Mohnot et al. | 516/122 |

FOREIGN PATENT DOCUMENTS

| | | |
|---|---|---|
| JP | 52-53012 | 4/1977 |
| JP | 55005830 | 1/1980 |
| JP | 56-157 | 1/1981 |
| JP | 57-014091 | 1/1982 |
| JP | 57107878 | 5/1982 |
| JP | 58110287 | 6/1983 |
| JP | 59068292 | 4/1984 |
| JP | 59123696 | 7/1984 |
| JP | 60018383 | 1/1985 |
| JP | 60 210984 | 10/1985 |
| JP | 60 219083 | 11/1985 |
| JP | 61 020797 | 1/1986 |
| JP | 61135786 | 6/1986 |
| JP | 61 148092 | 7/1986 |
| JP | 61 188183 | 8/1986 |
| JP | 62111782 | 5/1987 |
| JP | 62 149475 | 7/1987 |
| JP | 62 252779 | 11/1987 |
| JP | 01 108083 | 4/1989 |
| JP | 02 136279 | 5/1990 |
| JP | 02 276671 | 11/1990 |
| JP | 03 027976 | 2/1991 |
| JP | 03 065376 | 3/1991 |
| JP | 03 067684 | 3/1991 |
| JP | 03 215082 | 9/1991 |
| JP | 03 251488 | 11/1991 |
| JP | 04 067986 | 3/1992 |
| JP | 04 263083 | 9/1992 |
| JP | 05 016517 | 1/1993 |
| JP | 05 278324 | 10/1993 |
| JP | 06 092011 | 4/1994 |
| JP | 06 183134 | 7/1994 |
| JP | 07 137431 | 5/1995 |
| JP | 07 276789 | 10/1995 |
| JP | 027093 | 1/2000 |
| JP | 209310 | 8/2001 |
| JP | 002094 | 1/2002 |

\* cited by examiner

*Primary Examiner*—B. Shewareged
(74) *Attorney, Agent, or Firm*—Muserlian, Lucas and Mercanti

(57) ABSTRACT

An ink-jet recording medium is disclosed. The ink accepting layer of the recording medium contains silica dispersion containing silica particles having a ratio of a free silanol group of 1.0 to 4.5. Silica particles and silica particle dispersion are also disclosed.

7 Claims, 1 Drawing Sheet

INK-JET RECORDING MEDIUM, SILICA PARTICLES AND SILICA DISPERSION

FIELD OF THE INVENTION

The invention relates to silica dispersion to be used for ink-jet recording medium, hereinafter referred to as recording medium, a production method of the silica dispersion, ink-jet recording medium using the silica dispersion and the ink-jet recording medium produced by the production method.

BACKGROUND OF THE INVENTION

The ink-jet recording method is a method for recording an image or a character by flying fine droplets by various operation principles to adhere onto recording medium. Recently, the method has been rapidly spread since the method has merits such as that relatively high speed printing and low noise printing can be performed and multicolor printing can be easily realized. Moreover, the method has been applied to a high quality printing such as photographic image. Consequently, recording medium having high ink absorbability and that without foreign substance and clack on the surface and improved in the producing efficiency, and a producing method of such the recording medium are required.

Many proposals have been disclosed for satisfying these requirements.

Many recording medium have been proposed, for example, the recording medium described in Japanese Patent Publication Open to Public Inspection, hereinafter referred to as JP O.P.I. Publication, No. 52-53012 which is constituted by a low-sized raw paper in which a coating liquid for surface treatment is permeated, the recording medium described in JP O.P.I. No. 55-5830 which is constituted by a support and an ink absorbable layer coated on the support, the recording medium described in JP O.P.I. Publication No. 56-157 which contains non-colloidal silica as a pigment, the recording medium described in JP O.P.I. No. 57-107878 in which an inorganic pigment and an organic pigment are used in combination, the recording medium described in JP O.P.I. No. 58-110287 which has two peaks in the distribution of pores, the recording medium described in JP O.P.I. No. 62-111782 which has upper and lower porous layers, recording medium described in JP O.P.I. Nos. 59-68292, 59-123696 and 60-18383 which has irregular-shaped cracks, the recording medium described in JP O.P.I. Nos. 61-135786, 61-148092 and 62-149475 which has a fine powder layer, the recording medium described in JP O.P.I. Nos. 62-252779, 1-108083, 2-136279, 3-65376 and 3-27976 which contains a pigment or a fine particle of silica each having a specified physical property, the recording medium described in JP O.P.I. Nos. 57-14091, 60-219083, 60-210984, 61-20797, 61-188183, 5-278324, 6-92011, 6-183134, 7-137431 and 7-276789 which contains a fine particle of silica such as colloidal silica, and the recording medium described in JP O.P.I. Nos. 2-276671, 3-67684, 3-215082, 3-251488, 4-67986, 4-263083 and 5-16517 which contains a fine particle of hydrated alumina. However, one satisfying the requirements is not found yet.

JP O.P.I. No. 2001-209310 discloses a producing method of inorganic pigment suspension for raising the production efficiency. JP O.P.I. Nos. 2000-27093 and 2002-2094 describe techniques for inhibiting the coating fault and raising the production efficient, but technique satisfying the requirement is not found yet.

SUMMARY OF THE INVENTION

The invention has been made on the foregoing background, and the object of the invention is to provide a powdered silica particles a producing method of ink-jet recording medium using the silica dispersion and a producing method of the silica dispersion which are improved in the occurrence of cracks and the producing efficient.

The invention and its embodiment are described.

An ink-jet recording medium having a support and an ink accepting layer prepared by coating a silica dispersion containing silica particles, wherein a ratio of a free silanol group is from 1.0 to 4.5,
wherein Free silanol group ratio=Absorbance at 3760 $cm^{-1}$/Absorbance at 1870 $cm^{-1}$.

The ink-jet recording medium mentioned above, wherein the silica particles are produced by a gas phase method.

The ink-jet recording medium mentioned above, wherein the silica particles have a moisture content of from 1.5 to 5.0%.

The ink-jet recording medium mentioned above, wherein the silica particles are obtained by steam blowing to the silica produced by the gas phase method having a moisture content of from 0.1 to 1.0%.

The ink-jet recording medium mentioned above, wherein the silica particles have an average primary particle diameter of from 3 to 100 nm.

The ink-jet recording medium mentioned above, wherein the silica dispersion further comprises a water-soluble polymer.

The water-soluble polymer is preferably polyvinyl alcohol.

The ink-jet recording medium mentioned above, wherein the ink accepting layer comprises further a cationic polymer.

Silica particles in which a ratio of a free silanol group is from 1.0 to 4.5.

The silica particles mentioned above, wherein the silica particles are produced by a gas phase method.

The silica particles mentioned above, wherein the silica particles have a moisture content of from 1.5 to 5.0%.

The silica particles mentioned above, wherein the silica particles are obtained by steam blowing to the silica produced by the gas phase method having a moisture content of from 0.1 to 1.0%.

The silica particles mentioned above, wherein the silica particles have an average primary particle diameter of from 3 to 100 nm.

A silica dispersion comprising silica particles mentioned above dispersed in an aqueous medium.

The silica dispersion mentioned above, wherein a silica content is from 19 to 35% by weight based on the silica dispersion.

A method for producing the silica dispersion comprising the step of dispersing the silica particles by a sand mill.

An ink-jet recording medium obtained by coating the silica dispersion containing the silica dispersion on a support.

A method for producing the ink-jet recording medium comprising the step of coating the silica dispersion produced by the foregoing producing method.

DETAILED DESCRIPTION OF THE INVENTION

Figure 1:
FIG. 1 shows an example of the infrared spectral absorption curve of silica.

The ink-jet recording medium according to the invention comprises a support and an ink accepting layer which is provided by coating a silica dispersion on the support to form a porous layer.

In the ink-jet recording medium according to the invention, silica was used to form an ink accepting layer having pores. For forming the ink accepting layer, it is preferable to coat a coating liquid which prepared by mixing a dispersion comprising silica dispersed in an aqueous medium and a water-soluble polymer. As the water-soluble polymer, poly vinyl alcohol is preferably used. The silica is preferably dispersed in high concentration for raising the production efficiency. Lower viscosity of the dispersion is preferable from the viewpoint of easiness of handling. It is preferable that the amount of coarse particles contained in the dispersion is few since the presence of many coarse particles in the coated layer causes lowering of the quality by occurrence of cracks.

Silica is roughly classified into silica produced by a gas phase method, hereinafter referred to as gas phase method-silica, and silica produced by a wet method, hereinafter referred to as wet method-silica, according to the production method thereof. The wet method-silica is classified into silica produced by a gelation method, hereinafter referred to as gel method-silica, and silica produced by a sedimentation method, hereinafter referred to as sedimentation method-silica.

The gas phase method-silica is produced by burning of silicon tetrachloride by oxygen and hydrogen. The high glossiness can be easily obtained and the pores can be easily formed by the gas phase method-silica. However, it has drawbacks such as that the silica is difficultly dispersed in high concentration in the aqueous medium, the storage stability of the dispersion is low and cracks ten to be occurred in the state of the coated layer since such the silica has low apparent specific gravity and the spherical particles tend to be coagulated in a net shape.

The gel method-silica is produced, for example, by the following procedure. Silica sol is formed by mixing sodium silicate prepared from siliceous sand with high purity as the raw material. The silica sol is gradually polymerized and forms primary particles and further three dimensionally coagulated so as to be gelled. The silica is powdered into fine particles by a usual method such as a gas stream crushing method. Namely, in the gel method, silica is reacted and polymerized in an acidic condition and stood until gelled, and washed and dried, thus gel-method silica is obtained. The sedimentation method-silica is obtained by reaction and polymerization under an alkaline condition and sedimentation and drying. The wet method-silica has merits such as that the silica is easily dispersed in an aqueous medium and a high concentration dispersion can be obtained.

However, the wet method-silica also has a drawback such as that the high glossiness is difficultly obtained, the pores is difficultly formed, the insufficient dispersion tends to occurred when the powdering was insufficient and crack are easily occurred.

The gas phase method-silica is preferably used by which high porosity can be obtained, even though both of the gas phase method-silica and the wet method-silica are usable.

The average particle diameter of the primary particles of the gas phase method-silica is preferably from 3 to 100 nm, more preferably from 4 to 50 nm, most preferably from 4 to 20 nm.

The gas phase method-silica to be used in the invention preferably has a large specific surface area. The specific surface area is preferably from 150 to 400 $m^2/g$, preferably from 200 to 300 $m^2/g$, in BET value.

Fine particle silica synthesized by the gas phase method having an average primary particle diameter of from 4 to 20 nm, which as most preferably usable is available on the market as, for example, Aerosil produced by Nihon Aerosil Co., Ltd.

However, when such the silica available on the market is used, the viscosity is rapidly raised when the silica is dispersed in high concentration, and the dispersion tens to be insufficient so as to increase the coarse particles which cause the occurrence of the cracks. Consequently, it is difficult to wholly satisfy the inhibition of the occurrence of crack and the raising of the production efficiency in the present circumstance.

As a result of the investigation by the inventors regarding the free silanol group ratio at the surface of silica particles, it is assumed that when the ratio of the free silanol is high, the bonding force between the silica becomes higher. Furthermore, when the water-soluble polymer such as poly vinyl alcohol is added, the hydrogen bonding force with the water-soluble polymer is strengthen and the viscosity of the dispersion is raised. Consequently, the coarse particles are increased and the occurrence of the cracks is caused. It is found that object of the invention can be attained by making the ratio of the free silanol group in the silica powder before dispersed in the aqueous medium to 1.0 to 4.5.

The free silanol group ratio in the invention is measured by an FT-IR method. Silica dried at 120° C. for 24 hours is subjected to the measurement by the FT-IR method. An infrared spectral absoptiometer is used for measurement. Silica is set between two of KRS-5 and the spectral adsorption is measured in the region of from 1,500 $cm^{-1}$ to 4,000 $cm^{-1}$. Example of the measuring apparatus is FT-IR-4100 manufactured by JASCO Corporation. In the absorption spectrum shown in FIG. 1, the dip at 3760 $cm^{-1}$ near the peak 1 at 3750 $cm^{-1}$ caused by Si—OH bond and the dip at 2120 $cm^{-1}$ near the peak 2 at 1870 $cm^{-1}$ caused by Si—O—Si bond is connected by a straight line as the base line of the peak 1, and the dip at 2120 $cm^{-1}$ and the dip at 1500 $cm^{-1}$ near the peak 2 are connected by a straight line as the base line of the Peak 2. The differences of absorbance at each of the peaks and that of each of the base line are each determined as the absorbance of each of the peaks.

The absorbance at 3760 $cm^{-1}$ caused by Si—O bond and that at 1870 $cm^{-1}$ caused by Si—O—Si bond are determined and the value calculated by the following formula is defined as the free silanol group ratio.

Free silanol group ratio=Absorbance at 3760 $cm^{-1}$/Absorbance at 1870 $cm^{-1}$ The free silanol group ratio, hereinafter referred to as IR ratio, according to the invention can be controlled by varying the moisture content of the silica.

The moisture content of the gas phase method-silica usually available on the market is 1.0% or less, principally from 0.1 to 0.9%, and the free silanol group ratio is from 5.0 to 7.0.

Consequently, it is preferable in the invention that the moisture content of the silica is controlled by blowing steam to the gas phase method-silica so as to make the moisture content into the range according to the invention.

The method for blowing steam include a method in which steam is continuously blown while the gas phase method-silica is conveyed and a method in which the gas phase method-silica is put into a tightly closed container and blown by steam while airing the silica.

In the case of the wet method-silica, such the silica originally has a moisture content of 5% or more. Accordingly, the silica powder should be heated and dried to control the silanol group ratio into the range of the invention. According to the investigation by the inventors, a temperature of 300° C. or more and a lot of labor are necessary and the control of the moisture is more difficult compared to the gas phase method-silica. Of course, the wet method-silica is usable when the condition of the silica is within the range of the invention.

The moisture content of the gas phase method-silica according to the invention is from 1.5 to 5%. When the moisture content is less than 1.5%, the viscosity of the dispersion is raised and a bad influence on the later process is occurred and when the moisture content is more than 5%, the particles of the silica are coagulated with together and difficultly dispersed.

The moisture content of the gas phase method-silica can be calculated by the following equation. When the weight of the gas phase method-silica dried at 120° C. for 24 hours is B and the weight of that before the drying is A:

Moisture content of gas phase method-silica=$\{(A-B)/A\} \times 100$

In the invention, a sand mill is preferably used for dispersing the gas phase method-silica even though a high pressure homogenizer, a high speed stirring dispersing machine, a sand mill and an ultrasonic dispersing machine are also usable.

Zirconia beads of not more than 1.0 mm, more preferably not more than 0.5 mm, are preferably used in the sand mill.

It is more preferable that the gas phase method-silica is preliminarily dispersed by a high speed dispersing machine or a pin mixer before the dispersion by the sand mill.

The gas phase method-silica and the aqueous medium are dispersed in a designated ratio to prepare the gas phase method-silica dispersion. The weight concentration of the gas phase method-silica is preferably from 5 to 40%, particularly preferably from 19 to 35%. The weight concentration is calculated by the following equation. When the weight concentration is less than 5%, the production efficiency is lowered and a large amount of dispersion is required and the dispersed state tends to be degraded. When the weight concentration exceeds 40%, the production efficiency is lowered since the viscosity is raised and the load onto the later process is increased.

Weight Concentration (%)=(Weight of gas phase method-silica÷ Weight of aqueous medium)×100

The temperature in the dispersing process is preferably not more than 50° C. since the coagulation of the silica particles are progressed when the temperature is excessively raised.

The aqueous medium preferably contains a cationic polymer from the viewpoint of the dispersibility of the gas phase method-silica.

As the cationic polymer, a polymer having a quaternary ammonium base is preferable, and a homopolymer of a monomer having the quaternary ammonium base or a copolymer of such the polymer and one or two kinds of other copolymerizable monomer are particularly preferable.

As examples of the monomer having the quaternary ammonium base, the followings can be exemplified.

Formula 1

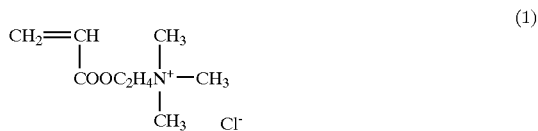

(1)

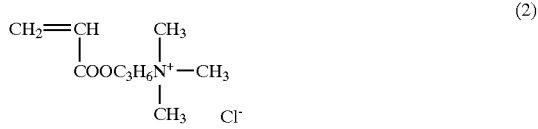

(2)

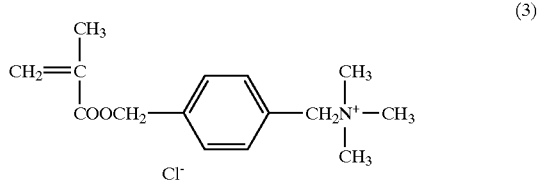

(3)

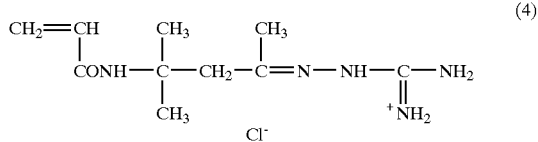

(4)

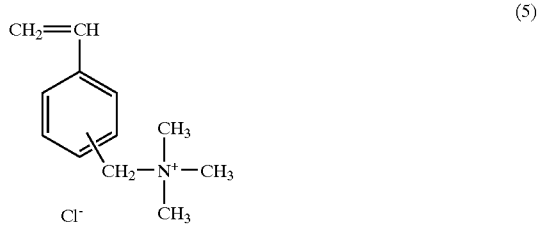

(5)

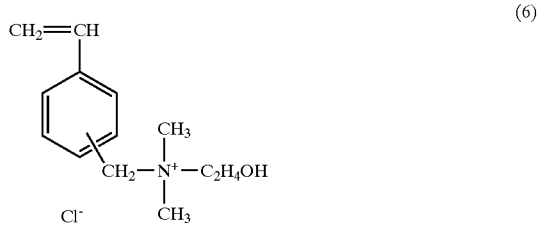

(6)

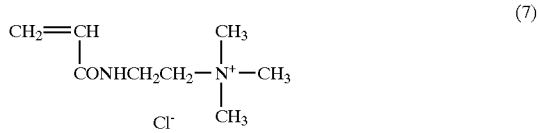

(7)

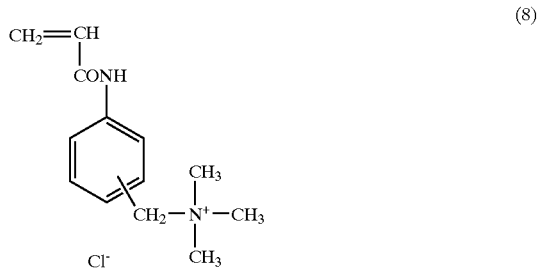

(8)

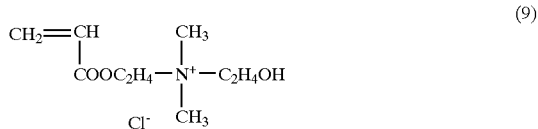

(9)

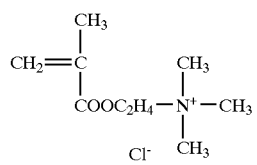

Formula 2

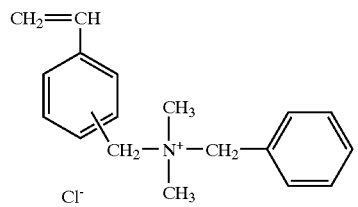

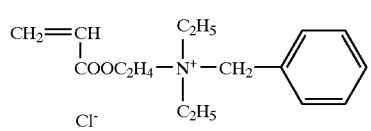

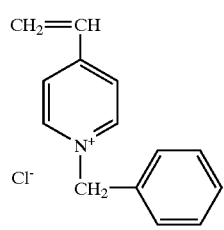

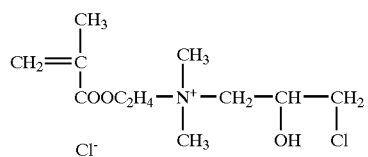

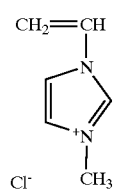

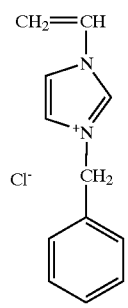

The monomer capable of copolymerizing with the monomer having the quaternary ammonium base is a compound having an ethylenic unsaturated group; examples of such the compound include the followings.

Formula 3

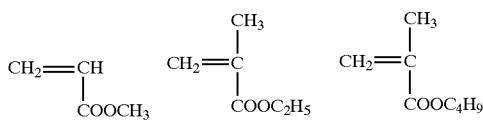

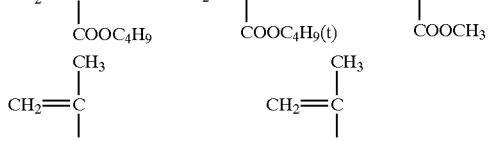

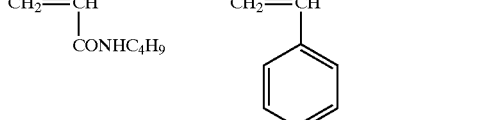

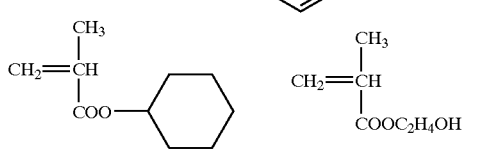

When the cationic polymer having the quaternary ammonium base is the copolymer, the ratio of the cationic monomer is preferably not less than 10 mole-%, more preferably not less than 20 mole-%, particularly preferably not less than 30 mole-%.

The monomer having the quaternary ammonium base may be used singly or in combination of two or more kinds.

Examples of the cationic polymer preferably usable in the invention are shown below.

Formula 4

P-1

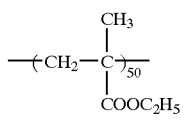

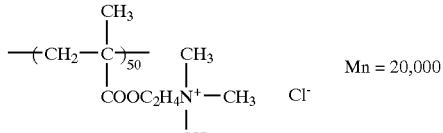

Mn = 20,000

P-2

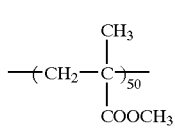

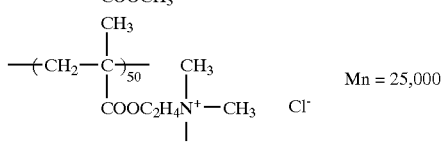

Mn = 25,000

P-3
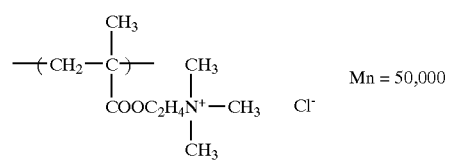 Mn = 50,000
P-4
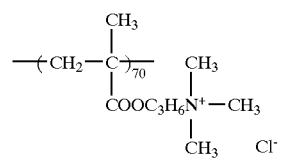
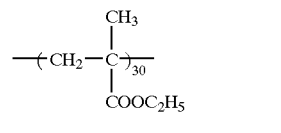 Mn = 63,000
Formula 5
P-5
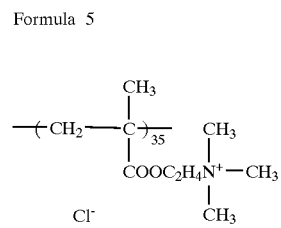 Mn = 19,000
P-6
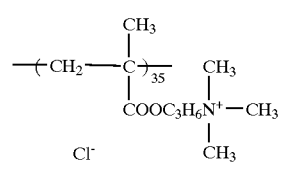 Mn = 72,000
P-7
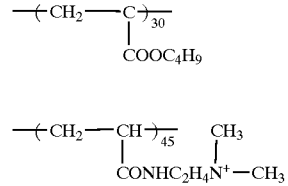 Mn = 22,000
P-8
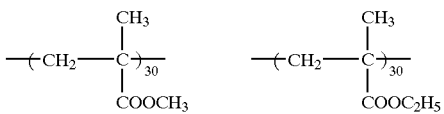 Mn = 46,000
P-9
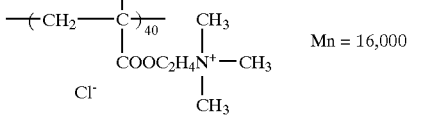
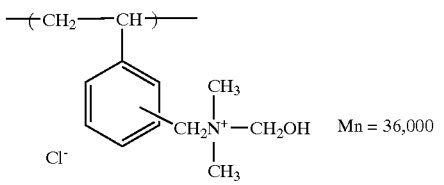 Mn = 16,000
P-10
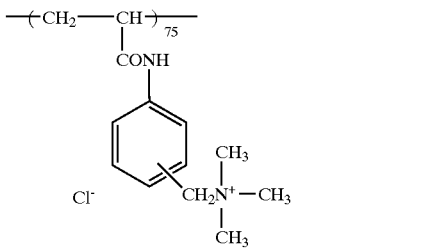 Mn = 36,000
Formula 6
P-11
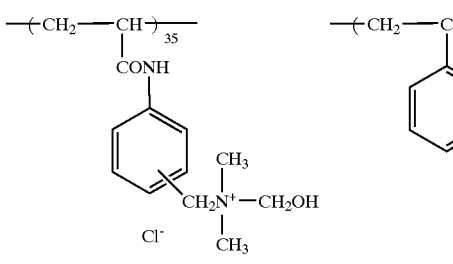 Mn = 56,000
P-12
 Mn = 32,000
P-13
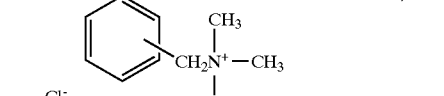 Mn = 24,000
P-14
 Mn = 19,000

Formula 7 -continued

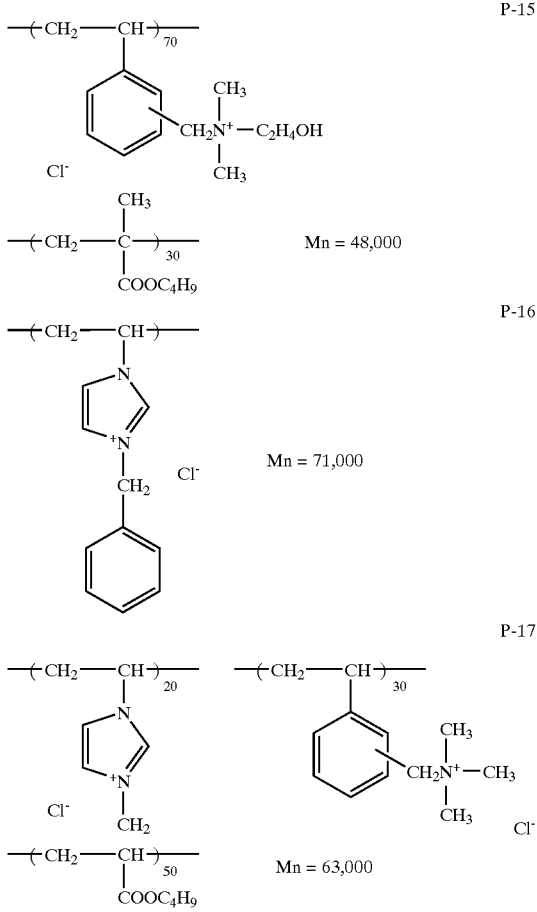

The cationic polymer having the quaternary ammonium base is usually has high water-solubility by presence of the quaternary ammonium base. Ones capable of being not sufficiently dissolved in water are formed according to the composition or the ratio of the monomer having no quaternary ammonium base. However, they can be used in the invention as long as the polymer can be dissolved in a mixture solvent of water and a water-miscible organic solvent.

The water miscible organic solvent is an organic solvent which can be dissolved in water in a ratio of not less than 10%. Examples of such the solvent include an alcohol such as methanol, ethanol, iso-propanol and n-propanol; a glycol such as ethylene glycol, diethylene glycol and glycerol; an ester such as ethyl acetate and propyl acetate; a ketone such as acetone and methyl ethyl ketone; and an amide such as N,N-dimethylformamide. In such the case, it is preferable that the amount of the organic solvent is smaller than that of water.

The number average molecular weight of the cationic polymer is preferably not more than 100,000. The number average molecular weight Mn is a value measured by gel permeation chromatography and converted to the value of polyethylene glycol.

When the number average molecular weight exceeds 100,000, coagula are considerably occurred when the cationic polymer solution is added to the dispersion of the gas phase method-silica, the surface of which is anionic; and uniform dispersion difficultly obtained even when the dispersion is subjected to a dispersing treatment after the coagula are formed. Accordingly, the uniform dispersion is hardly obtained since a lot of coarse particle is contained in the dispersion. If ink-jet recording medium is prepared by the use of such the cationic polymer and the gas phase method-silica, high glossiness is difficultly obtained. Particularly preferable number average molecular weight is not more than 50,000. The lower limit of the number average molecular weight is usually not less than 2,000.

The ratio of the gas phase method-silica and the cationic polymer may be changed depending on the kind or the diameter thereof, or the kind or the number average molecular weight of the cationic polymer.

In the invention, the ratio is preferably from 1:0.01 to 1:1 as that the surface of the gas phase method-silica is changed to cationic and stabilized.

Various additives may be added on the occasion of the preparation of the dispersion.

Examples of the additive usable according to necessity include a nonionic or cationic surfactant, an anionic surfactant is not preferred since coagulum is occurred; a defoaming agent; a nonionic hydrophilic polymer such as polyvinyl alcohol, polyvinyl pyrrolidone, polyethylene oxide, polyacrylamide, a sugar, gelatin and Pullulan; a nonionic or cationic latex, a water-miscible organic solvent such as ethyl acetate, methanol, ethanol, iso-propanol, n-propanol and acetone; an inorganic salt; and pH controlling agent.

The use of the water-miscible organic solvent is preferable since such the solvent inhibits formation of fine limps on the occasion of mixing the gas phase method-silica and the cationic polymer. Such the water-miscible organic solvent is used in an amount of from 0.1 to 20%, particularly preferable from 0.5 to 10%, by weight of the dispersion.

The pH value on the occasion of the preparation of the dispersion is usually from 1 to 8, preferably from 2 to 7 even though the pH value can be widely changed depending on the kind of the gas phase method-silica, the kind of the cationic polymer and the kind of the additive.

Examples of the water-soluble polymer preferably usable in the invention include gelatin, preferably acid processed gelatin, polyvinyl pyrrolidone preferably one having an average molecular weight of about 200,000, Pullulan, polyvinyl alcohol and its derivative, cation-modified polyvinyl alcohol, polyethylene glycol preferably one having an average molecular weight of not less than 100,000, hydroxyethyl cellulose, dextran, dextrin and water-soluble polyvinyl butyral. These water-soluble polymers may be used singly or in combination of two or more kinds.

Particularly preferable water-soluble polymer is polyvinyl alcohol and cation-modified polyvinyl alcohol.

Polyvinyl alcohol preferably used in the invention is one having an average molecular weight of from 300 to 4,000; and one having an average molecular weight of not less than 1,000 is preferable since the layer containing such the polymer shows low brittleness.

The saponification degree of polyvinyl alcohol is preferably from 70 to 100 mole %, particularly preferably from 80 to 100 mole %.

Cationic modified polyvinyl alcohol is obtained by saponification of copolymer of an ethylenical unsaturated monomer having cationic group and vinyl acetate.

Examples of the an ethylenical unsaturated monomer having cationic group include trimethyl-(2-acrylamide-2,2-dimethylethyl) ammonium chloride, trimethyl-(3-acrylamide-3,3-dimethylpropyl) ammonium chloride, N-vinylimidazole, N-vinyl-2-methylimidazole, N-(3-dimethylaminopropyl) methacrylamide, hydroxyl ethyl dimethyl(3-methacrylamide) ammonium chloride, trimethyl-(3-methacrylamide propyl) ammonium chloride, and N-(1,1-dimethyl-3-dimethylaminopropyl) acrylamide.

Content ratio of a monomer containing the cationic modified group in the cationic modified polyvinyl alcohol is from 0.1 to 10 mol %, preferably from 0.2 to 5 mol % based on the vinyl acetate.

Polymerization degree of the cationic modified polyvinyl alcohol is preferably from 500 to 4,000, and more preferably from 1,000 to 4,000.

Saponification degree of the cationic modified polyvinyl alcohol is preferably from 60 to 80 mol %, and more preferably from 70 to 90 mol %.

In the preferable embodiment of the invention, the gas phase method-silica is used in the primary particle state and polyvinyl alcohol or the modified polyvinyl alcohol is used as the water-soluble polymer. In such the case, the silanol group at the surface of the gas phase method-silica fine particle and the hydroxide group of polyvinyl alcohol form a weak hydrogen bond so that a soft coagulum is formed and high porosity is easily obtained. The water-soluble polymer is preferably dissolved at 100 to 150° C. for raising the solubility thereof.

As the support of the ink-jet recording medium, a know support for the ink-jet recording medium such as a paper support, a plastic support or transparent support and a complex support may be used. It is preferable to use a hydrophobic support in which the ink liquid cannot be permeated for obtaining a sharp image with high density.

Examples of the transparent support include a film of a polyester resin, a diacetate resin, a triacetate resin, an acryl resin, a polycarbonate resin, a polyvinyl chloride resin, a polyimide resin, cellophane and celluloid. Among them, one capable of proofing against radiant heat on the occasion of the use on the OHP is preferable. Polyethylene terephthalate is particularly preferred. The thickness of such the support is preferably from 10 to 200 µm. It is preferable from the viewpoint of the adhesive ability with the coated layer to provide a subbing layer on the side of the ink accepting layer or the side of the backing layer the transparent support.

When transparency is not required to the support, resin coated paper so called as RC paper constituted by a raw paper and a polyolefin layer containing white pigment coated at least one side of the raw paper, and polyethylene terephthalate containing white pigment so called as white PET support are preferred.

The method for coating the coating liquid on the support can be optionally selected. In such the case, two or more layers can be simultaneously coated. It is preferable that all the hydrophilic layers are simultaneously coated at once.

As the coating method, a roller coating method, a rod bar coating method, an air-knife coating method, a curtain coating method and a extrusion coating method using a slide hopper described in U.S. Pat. No. 2,681,294 are preferably usable.

EXAMPLES

The invention is described in detail below referring examples. In the examples, % is absolute dried weight % as long as specific description is not attached.

<Preparation of Gas Phase Method-Silica S-1 through S-10>

Gas phase method-silica on the market Aerosil A300, produced by Nihon Aerosil Co., Ltd., was charged into a tightly closed container and blown by steam while holding the pressure in the container at not more than 1.96 Pa, and the amount and the time of the steam blowing were changed so that the IR ratio and the moisture content were adjusted to those described in Table 1. Thus gas phase method-silica Samples S-1 through S-8 were prepared.

The IR ratio and the moisture content of the gas phase method-silica were measured by the foregoing methods.

<Preparation of the Gas Phase Method-Silica Dispersions D-1 through D-13>

The gas phase method-silica dispersions D-1 through D-13 were prepared using S-1 through S-7 by changing the concentration of the gas phase method-silica and the dispersion method. The concentration of the gas phase method-silica and the dispersion method are shown in Table 1. The following additives were added to the gas phase method-silica dispersion.

Ratio to the weight of the gas phase method-silica

| P-9 | 12% |
|---|---|
| Boric acid | 1.6% |
| Borax | 1.6% |
| Ethanol | 7% |

S-1 through S-7 were each subjected to preliminary dispersion by Flow-jet Mixer, manufactured by Funken Powertechs Inc. at a circumference speed of 30 m/second. Thereafter the dispersions were subjected to the main dispersing process by a high pressure homogenizer, hereinafter referred to as MG, or a sand mill, hereinafter referred to as SM.

Dispersing by the high pressure homogenizer was performed 6 times at a pressure of 350 kg/sec, and that by the sand mill was performed for 3 minutes using 0.3 mm zirconia beds with a filling ratio of 80%.

<Evaluation of the Gas Phase Method-Silica Dispersion>

The dispersions D-1 through D-13 were each held at 40° C. and the viscosity of each of the dispersion was measured by a B-type viscometer.

Preparation of Coating Liquid 1 through 13 and Recording Medium 1 Through 13

Water-soluble polymer PVA235 produced by Kraray Co., Ltd., in an amount of 20% by weight of the silica was added to each of the Gas phase method-silica dispersions D-1 through D-13 so that the gas phase method-silica concentration was to be 18%. Thus Coating Liquids 1 to 13 were prepared. The temperature of the coating liquid was held at 40° C.

Each of the coating liquids was supplied to a slide hopper coating machine in a rate of 1 l/min and Recording mediums 1 through 13 were prepared respectively.

<Support>

Paper support coated by polyethylene on both sides was used. The support had a thickness of 220 µm and the polyethylene coated on the ink accepting layer side contained anatase type titanium dioxide in an amount of 13% by weight of polyethylene. The coating liquid was coated so that the layer thickness was to be 200 µm. The coated layer was cooled at 0° C. for 20 seconds just after the coating, and then dried by air of 25° C. and 15% of RH for 60 seconds, 45° C. and 25% of RH for 60 seconds and 50° C. and 25% of RH for 60 seconds in sequence, and conditioned in an atmosphere of from 20 to 25° C. and 40 to 60% of HR for 2 minutes.

<Evaluation of Recording Medium>

Evaluation of Crack Occurrence

Number of the cracks per 0.3 m² of the coated surface was visually counted. The samples having the crack number of not more than 10 are acceptable for practical use.

TABLE 1

| Silica | IR ratio | Moisture content (%) | Dispersing method | Dispersion | Silica concentration (%) | Viscosity of dispersion (mPa · S) | Coating liquid | Recording paper | Cracks | Remarks |
|---|---|---|---|---|---|---|---|---|---|---|
| S-1 | 5.0 | 0.3 | MG | D-1 | 25 | 2000 | 1 | 1 | More than 200 | Comp. |
| S-1 | 5.0 | 0.3 | SM | D-2 | 25 | 1200 | 2 | 2 | 52 | Comp. |
| S-2 | 4.5 | 1.5 | MG | D-3 | 25 | 800 | 3 | 3 | 10 | Inv. |
| S-2 | 4.5 | 1.5 | SM | D-4 | 25 | 500 | 4 | 4 | 7 | Inv. |
| S-3 | 4.5 | 3.0 | SM | D-5 | 25 | 400 | 5 | 5 | 6 | Inv. |
| S-4 | 3.0 | 3.0 | SM | D-6 | 25 | 300 | 6 | 6 | 3 | Inv. |
| S-5 | 3.0 | 4.0 | SM | D-7 | 25 | 280 | 7 | 7 | 3 | Inv. |
| S-6 | 3.0 | 6.0 | SM | D-8 | 25 | 700 | 8 | 8 | 10 | Inv. |
| S-7 | 1.3 | 3.0 | SM | D-9 | 25 | 220 | 9 | 9 | 2 | Inv. |
| S-4 | 3.0 | 3.0 | SM | D-10 | 33 | 730 | 10 | 10 | 8 | Inv. |
| S-4 | 3.0 | 3.0 | SM | D-11 | 20 | 150 | 11 | 11 | 1 | Inv. |
| S-4 | 3.0 | 3.0 | SM | D-12 | 36 | 1000 | 14 | 14 | 10 | Inv. |
| S-9 | 4.5 | 1.0 | SM | D-13 | 25 | 1000 | 15 | 15 | 10 | Inv. |

Comp.; Comparative
Inv. ; Inventive

As is shown in Table 1, it is understood that the samples according to the invention are superior to the comparative samples in the occurrence of the cracks.

It was confirmed that the dispersion which had lowered viscosity and high suitability for handling in the later process can be obtained and the production efficiency can be raised by the production method of the recording medium according to the invention. And the recording medium produced by such the method is superior in that the crack occurrence was inhibited.

The ink-jet recording medium produced by the use of the silica powder and the silica dispersion is inhibited in the occurrence of the cracks; and the production efficiency of the ink-jet recording medium can be raised by the production method of the ink-jet recording medium using such the silica dispersion.

What is claimed is:

1. An ink-jet recording medium having a support and an ink accepting layer prepared by coating a silica dispersion containing silica particles, wherein the silica particles are produced by a gas phase method, and a ratio of a free silanol group of the silica particles is from 1.0 to 4.5, wherein Free silanol group ratio =Absorbance at 3760 cm$^{-1}$/Absorbance at 1870 cm$^{-1}$.

2. The ink-jet recording medium of claim 1, wherein the silica particles have a moisture content of from 1.5 to 5.0%.

3. The ink-jet recording medium of claim 1, wherein the silica particles are obtained by steam blowing to the silica produced by the gas phase method having a moisture content of from 0.1 to 1.0%.

4. The ink-jet recording medium of claim 1, wherein the silica particles have an average primary particle diameter of from 3 to 100 nm.

5. The ink-jet recording medium of claim 1, wherein the silica dispersion further comprises a water-soluble polymer.

6. The ink-jet recording medium of claim 5, wherein the water-soluble polymer is polyvinyl alcohol.

7. The ink-jet recording medium of claim 1, wherein the ink accepting layer comprises further a cationic polymer.

* * * * *